United States Patent Office 2,821,168
Patented Jan. 28, 1958

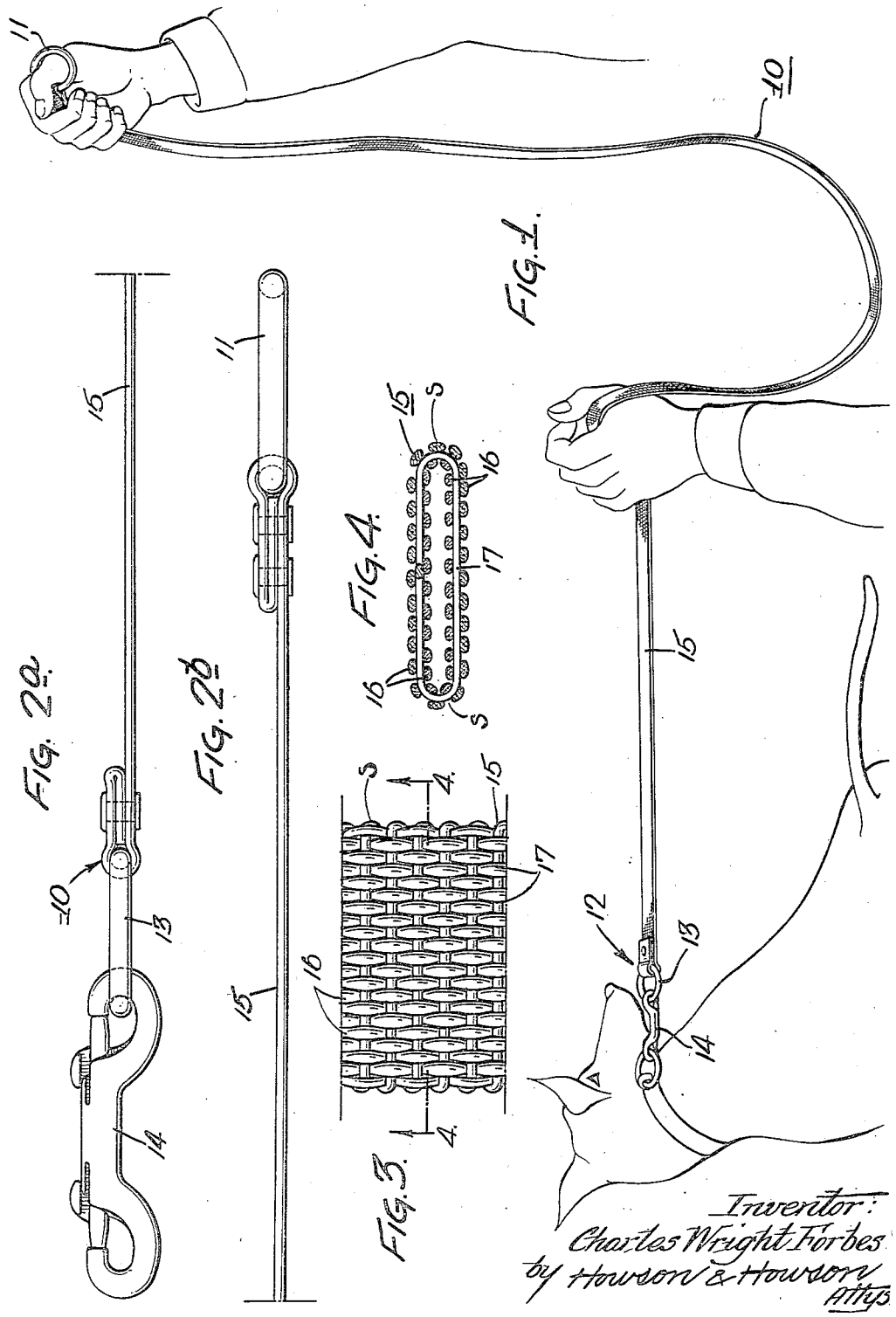

2,821,168

FABRIC LEASH FOR ANIMALS

Charles Wright Forbes, Wayne, Pa.

Application November 10, 1954, Serial No. 468,017

5 Claims. (Cl. 119—109)

The present invention relates to an improvement in leashes by which animals may be led and controlled in their movements. It was conceived and developed as a leash to be used in control of the movements of domestic animals such as dogs.

An object of the invention has been to provide a leash which is attractive in appearance and economical to manufacture, and which, at the same time will avoid certain hazards and injuries which have frequently resulted from use of fabric leashes of the prior art.

In use of leashes of the well-known type involving a tape, strip or rope of fabric material, the user frequently suffers injury due to cutting of the hands by the leash line when the animal makes a sudden forceful movement while the leash fabric is grasped in one or both of his hands. This tendency is present regardless of whether the leash be of cotton, wool or other fabric, but it is especially pronounced when nylon or equivalent synthetic fabrics are used. The principal object of the invention has been to obviate this difficulty, especially in the use of fabrics which may be of nylon or similar material.

A further object of the invention has been to provide a leash which, by frictional yielding resistance within the body of the material of the leash line itself, will absorb suddenly applied forces and transmit them through the hand more gradually, thereby minimizing the tendency to cut the hand of the user by enabling him to get a firm grip on the line before any sliding can occur. In use, the leash line is preferable to those of the prior art both because it enables the user to minimize sliding of the leash through the fingers and because applied forces are transferred between the plies of the line through internal friction in such a way as to cushion and avoid the cutting of the hands, even in cases where the slippage occurs.

Still further objects and advantages of the invention, and the way in which they have been attained, will be evident from reading of the following detailed description in the light of the attached drawing, in which, Figure 1 is a perspective view of the leash of the invention, Figure 2a is a side elevation of the attaching clip and end of the leash line connected thereto, Figure 2b is a similar view of the ring handle and associated end of the line, Figure 3 is a plan view on an enlarged scale of one side of the leash line, and Figure 4 is a cross-section on the line 4—4 of Figure 3.

In the drawing, there is illustrated a leash 10 having a handle at one end in the form of a ring 11 adapted to be held by the user, an attaching clip 12 in the form of a ring 13 and snap hook 14, and a leash line 15 interconnecting the handle 11 and clip 12.

The leash line may be made of nylon or other filamentary material, and may be fabricated by any suitable process such as weaving, knitting or braiding. Its essential feature consists in the fact that it comprises a flexible strip of fabric doubled upon itself into tubular form and having the tube walls flattened to form a two-ply flat tape or strip with the adjacent flattened walls unconnected with each other except at their sides S. Such a strip may be formed as a seamless tube by weaving the strands on a suitable narrow fabric loom. A seamless tubular nylon fabric such as used as a shroud line for parachute cords may, for example, be employed in a width of from ½″ to ¾″ with 25 warp strands 16 per inch of width in each ply and 13 weft strands 17 per inch of length.

Experience in use of leashes with leash lines fabricated as two-ply flattened tubular bodies in this manner has proved that they have all of the advantages discussed above. With the line held in the hand of the user, as illustrated in Figure 1 of the drawing, when the dog gives a sudden jerk the impact force is cushioned by friction between the plies. This fact in itself diminishes the normal tendency to cut the hands, and also provides a time interval of brief duration within which the user can improve his grip on the line to prevent sliding from occurring. The increase bulk or body of the cross-section of the line as compared to single ply lines is also of assistance in this connection.

I wish it to be understood that the term "leash" as used in the specification and claims of this application is intended to include a somewhat broader class of devices than that ordinarily understood in common conversational usage of this term, as the features of the invention may be used in any connection where it is desired to control movements of an animal secured to the line, and I intend to include control lines having the defined features within the attached claims, regardless of the animal to be controlled and regardless of whether the term "leash" would ordinarily be applied to a line for control of such animal.

While the invention has been described specifically with reference to a single embodiment of the invention, persons skilled in the art will realize that various modifications and refinements are available, and I do not therefore intend to be limited except by the scope of the following claims:

I claim:

1. A leash for animals comprising an attaching clip and a leash line secured thereto consisting of a continuous flexible longitudinally extending strip of fabric material having opposed frictionally engaged walls forming a two-ply tape, and the opposed walls thereof being interconnected with one another solely at their side portions and coextensive with the length thereof whereby said opposed side walls are relatively slidable with respect to one another over the full length thereof from said clip, and adapted to cushion forces applied to the leash by friction between the plies.

2. A leash for animals as claimed in claim 1, said fabric strip being continuous and comprising a flattened tube, the interconnecting side portions being integral with the material forming said opposed side walls.

3. A leash for animals as claimed in claim 2 and wherein said fabric strip is composed of nylon.

4. A leash for animals as claimed in claim 3, said strip comprising a woven fabric.

5. A leash for animals as claimed in claim 4 and further including a handle secured to the end of the leash at the opposite end thereof from said attaching clip.

References Cited in the file of this patent

UNITED STATES PATENTS

| | | |
|---|---|---|
| 1,147,135 | Batchelder | July 20, 1915 |
| 1,840,945 | Guinzburg | Jan. 12, 1932 |
| 2,196,627 | De Sanctis | Apr. 9, 1940 |
| 2,652,809 | Foster | Sept. 22, 1953 |

FOREIGN PATENTS

| | | |
|---|---|---|
| 512,534 | Great Britain | Sept. 19, 1939 |